US012693118B2

(12) United States Patent
Carulli et al.

(10) Patent No.: US 12,693,118 B2
(45) Date of Patent: Jul. 28, 2026

(54) MICROELECTROMECHANICAL GYROSCOPE WITH DETECTION OF ANGULAR VELOCITY ALONG A VERTICAL AXIS

(71) Applicant: STMICROELECTRONICS S.r.l., Agrate Brianza (IT)

(72) Inventors: Paola Carulli, Milan (IT); Luca Giuseppe Falorni, Limbiate (IT); Patrick Fedeli, Senago (IT); Luca Guerinoni, Alzano Lombardo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 369 days.

(21) Appl. No.: 18/490,392

(22) Filed: Oct. 19, 2023

(65) Prior Publication Data

US 2024/0142235 A1    May 2, 2024

(30) Foreign Application Priority Data

Oct. 31, 2022    (IT) ......................... 102022000022377

(51) Int. Cl.
*G01C 19/5762*    (2012.01)
*G01C 19/5747*    (2012.01)

(52) U.S. Cl.
CPC ..... *G01C 19/5762* (2013.01); *G01C 19/5747* (2013.01)

(58) Field of Classification Search
CPC ......................... G01C 19/5747; G01C 19/5762
See application file for complete search history.

(56) References Cited

U.S. PATENT DOCUMENTS

| | | | | |
|---|---|---|---|---|
| 2005/0066728 A1* | 3/2005 | Chojnacki | .......... | G01C 19/5719 |
| | | | | 73/514.16 |
| 2007/0241076 A1* | 10/2007 | Moffat | ................ | B81C 1/00174 |
| | | | | 216/2 |
| 2010/0281977 A1* | 11/2010 | Coronato | .......... | G01C 19/5747 |
| | | | | 29/592.1 |

(Continued)

FOREIGN PATENT DOCUMENTS

EP          3951403 A1    2/2022

*Primary Examiner* — Herbert K Roberts
(74) *Attorney, Agent, or Firm* — Seed Intellectual Property Law Group LLP

(57)    ABSTRACT

A microelectromechanical gyroscope with detection along a vertical axis is provided with a detection structure having a movable structure, suspended above a substrate so as to perform, as a function of an angular velocity around the vertical axis a sense movement along a first horizontal axis. The movable structure has at least one drive mass internally defining a window, elastically coupled to a rotor anchor, at an anchoring region, through elastic anchoring elements; at least one bridge element, rigid and of a conductive material, cantilevered suspended and extending within the window along the first horizontal axis, elastically coupled to the drive mass; movable electrodes, carried integrally by the bridge element with extension along a second horizontal axis. The detection structure also has stator electrodes, arranged in the window and interdigitated with the movable electrodes, at a certain separation distance below the bridge element, which extends longitudinally above the same stator electrodes and the movable electrodes.

16 Claims, 3 Drawing Sheets

(56)         References Cited

U.S. PATENT DOCUMENTS

| | | | |
|---|---|---|---|
| 2013/0220016 A1* | 8/2013 | Simoni | B81C 1/00198 |
| | | | 73/514.32 |
| 2015/0338246 A1* | 11/2015 | Robert | H01G 5/16 |
| | | | 324/661 |
| 2016/0083249 A1* | 3/2016 | Geisberger | B81B 3/0078 |
| | | | 438/52 |
| 2017/0108530 A1* | 4/2017 | Tocchio | G01P 1/00 |
| 2021/0363000 A1 | 11/2021 | Allegato et al. | |

* cited by examiner

MICROELECTROMECHANICAL GYROSCOPE WITH DETECTION OF ANGULAR VELOCITY ALONG A VERTICAL AXIS

BACKGROUND

Technical Field

The present disclosure relates to a microelectromechanical gyroscope (of the MEMS—Micro-Electro-Mechanical Sensor—type), with detection of angular velocity along a vertical axis (z axis), having improved performances, in particular having improved stability with respect to stresses or external stimuli, which constitute a disturbance with respect to a quantity (angular velocity) to be detected.

Description of the Related Art

MEMS gyroscopes are known, whose detection structure comprises at least one movable mass, also defined as "rotor mass" (without this necessarily implying a rotational movement), arranged suspended above a substrate and having a main extension plane parallel, in a rest condition, to a horizontal plane and to a top surface of the same substrate.

When a rotation at a certain angular velocity is applied to the movable mass of the MEMS gyroscope, which is driven with a linear speed, the movable mass senses a apparent force, called the Coriolis force, which determines a displacement thereof in a direction perpendicular both to the direction of the linear driving speed and to the axis around which the aforementioned rotation occurs. The movable mass is supported by elastic elements that allow a displacement thereof in the direction of the apparent force. According to Hooke's law, the displacement is proportional to this apparent force, thus being indicative of the Coriolis force and the value of the angular velocity to be detected.

In particular, in the case of a gyroscope with detection capacity along the vertical axis z, the linear driving is implemented along a first axis of the horizontal plane and the angular velocity is detected around a vertical axis (z axis), orthogonal to the same horizontal plane, so that the displacement of the movable mass due to the Coriolis effect occurs along a second horizontal axis of the horizontal plane (orthogonal to the first horizontal axis).

The displacement of the movable mass is detected in a capacitive manner, determining, in a resonance condition, the capacitance variations caused by the movement of the movable mass with respect to fixed sense electrodes, so-called "stator electrodes," forming with the movable mass, or with movable electrodes integral with the same movable mass, a capacitive coupling and a resulting detection capacitor with variable capacitance as a function of the quantity to be detected.

The movable mass (and, if any, the associated movable electrodes) is coupled to a corresponding rotor anchor (integral with the substrate) by elastic elements, suitably configured so as to allow the driving and angular velocity detecting movements.

The stator electrodes are in turn coupled integrally, in a fixed manner, to the substrate by respective stator anchors, distinct from each other and separate with respect to the rotor anchor.

In particular, in the detection structure, the aforementioned rotor and stator anchors have a dual function, of mechanical anchoring towards the substrate and also of electrical coupling for biasing the corresponding stator electrodes and the movable mass (and the associated movable electrodes) and for detecting the capacitance variation signal.

In a known manner, the detection structure of the MEMS gyroscope is housed within a package, typically together with an associated ASIC (Application Specific Integrated Circuit) electronic circuitry, which represents its mechanical and electrical interface towards the external environment, for example towards an electronic apparatus wherein the same MEMS gyroscope is used.

A problem affecting MEMS gyroscopes (and in general MEMS sensors having detection structures of the capacitive type) is due to possible occurrence of measurement errors when stress and deformations occur, in particular which are induced in the detection structure due to the interaction with the package, for example as the temperature and/or the environmental conditions vary or due to mechanical stresses.

For example, the package of a MEMS sensor is subject to deformations as the temperature varies, due to the different thermal expansion coefficients and to the different values of the Young's modulus of the different constituent materials, causing corresponding deformations of the substrate of the detection structure; similar deformations may occur due to ageing of the materials, or to particular stresses induced from the external environment, for example during soldering of the package on a printed circuit, or due to absorption of humidity by the materials forming the same package.

As shown schematically in FIG. 1, in the presence of deformations of a substrate 2, for example due to a thermal stress associated with a temperature gradient, a deformation (or bending) of a top surface 2a of the same substrate 2 may occur (FIG. 1 showing this deformation in an accentuated manner, for reasons of clarity of illustration); this deformation may entail a variation of the mutual distance between the stator anchors, indicated here by 3a and 3b (by way of example two of them are shown in the aforementioned FIG. 1) and the rotor anchor, here indicated by 4, with respect to an initial rest condition, i.e., in the absence of angular velocity to be detected.

Consequently, an undesired capacitance variation occurs for the detection capacitor formed between the same movable mass and the stator electrodes, in a rest condition, with a resulting variation of the so-called Zero Rate Level (ZRL) of the MEMS gyroscope. This variation is also variable as a function of the temperature, or in general of all those external effects capable of inducing deformations of the same substrate.

In essence, therefore, a variation (so-called "drift") occurs of the output signal at rest provided by the MEMS gyroscope, the aforementioned ZRL level, and a consequent error in the angular velocity detection.

The so-called Scale Factor (SF) of the MEMS gyroscope, i.e., the ratio between the output provided and the angular velocity detected by the same MEMS gyroscope, is also modified.

In general, the described phenomena determine an instability of the detection output, indicated hereinbelow by $\Omega_{out}$, provided by the MEMS gyroscope during the life of the same MEMS gyroscope as a function of the input angular velocity, indicated by $\Omega_{in}$, which may be expressed as:

$$\Omega_{out} = SF \cdot \Omega_{in} + ZRL.$$

To overcome this drawback, various solutions have been proposed, some providing for the mechanical optimization of the detection structure, others providing for an electronic compensation; however, known solutions are not entirely satisfactory, being generally of a complex construction and/ or requiring high energy consumptions, not always compatible with portable or wearable applications wherein MEMS gyroscopes are used.

BRIEF SUMMARY

The present disclosure is directed, at least in part, the previously highlighted problems, in order to provide a MEMS gyroscope having improved stability and reduced drifts of its electrical characteristics with respect to external stimuli, such as thermal variations, mechanical or environmental stress or other various external stimuli.

BRIEF DESCRIPTION OF THE SEVERAL VIEWS OF THE DRAWINGS

For a better understanding of the present disclosure, a preferred embodiment thereof is now described, purely by way of non-limiting example and with reference to the attached drawings, wherein.

DETAILED DESCRIPTION

Figure 1:
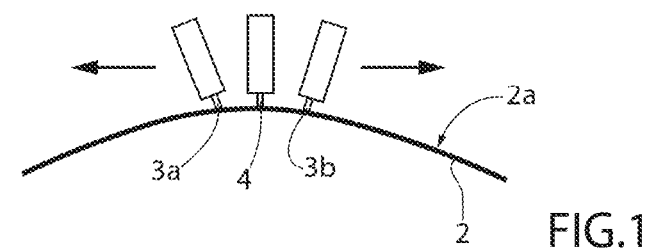
FIG. 1 is a schematic representation of a portion of a detection structure of a MEMS gyroscope, in the presence of a deformation of a corresponding substrate.

As will be described in detail below, one aspect of the present solution envisages forming the detection structure of a MEMS gyroscope with detection capacity along the vertical axis z, such that the movable mass (rotor) and the fixed electrodes (stator), capacitively coupled to the movable mass to define at least one detection capacitor, are mechanically coupled to the substrate at a common anchoring area (integrally coupled to the same substrate) having a reduced extension in the horizontal plane, in close mutual proximity; in this manner, possible deformations induced by the package in the substrate impact in a substantially equivalent manner on the movable mass (and on the associated movable electrodes) and on the stator electrodes, making the detection effectively insensitive to deformations, so as to avoid modifications of the output signal at rest provided by the same MEMS gyroscope (and the so-called drift of the ZRL level).

According to one aspect of the present solution, the detection structure comprises two superimposed structural layers of conductive material (in particular of epitaxial silicon), independent of each other and which are suitably processed (for example, by trench etchings and removal of sacrificial layers) to define the structural elements of the detection structure, at least in part superimposed on each other.

As will be described in detail below, in a bottom structural layer (interposed between the substrate and a top structural layer), the electrodes of the stator structure and the connection of the same electrodes towards the common anchoring area are defined, in particular for integrally mechanically coupling the stator electrodes to the substrate at the same anchoring area. In the top structural layer the rotor structure and in particular a bridge element of the same rotor structure are defined, the bridge element configured so as to be suspended above the stator electrodes (passing over the same stator electrodes) and to carry corresponding movable electrodes, so that the same movable electrodes are interdigitated and capacitively coupled to respective stator electrodes in a so-called "fully double-differential" capacitive coupling architecture (i.e., wherein the same rotor electrodes are coupled to a first group of stator electrodes, set to a given biasing voltage, such that their movement causes a first capacitance variation; and to a second group of stator electrodes, set to the same biasing voltage, such that their movement causes a second capacitance variation, equal and opposite to the first capacitance variation).

The formation of the detection structure through the aforementioned superimposed structural layers may for example be performed by the manufacturing process described in detail in EP 3 912 953 A1 in the name of the same Applicant.

In summary, this process provides for the growth, above a substrate, for example of monocrystalline silicon, of a first, thick, epitaxial layer, superimposed on a first sacrificial layer, of a dielectric material, which is then partly removed by chemical etching (e.g., by hydrofluoric acid vapors). The first sacrificial layer has openings, at which anchor regions to the substrate for the aforementioned first epitaxial layer are defined.

The first epitaxial layer is a first structural layer wherein first trenches (empty, or subsequently filled with dielectric material) are formed, for example with dry chemical etching of silicon, which define structural elements of the detection structure or a bottom part (i.e., closer to the substrate) of the same structural elements; conductive regions (defining pads and electrical interconnections) are formed below the first sacrificial layer, at the anchor regions to the substrate of the aforementioned first epitaxial layer, in order to allow the electrical biasing of the aforementioned structural elements.

Subsequently, the manufacturing process envisages formation of a second sacrificial layer, of a dielectric material, above the first epitaxial layer and definition of the same second sacrificial layer for forming sacrificial regions mutually separated by openings.

A second epitaxial layer, having for example a smaller thickness with respect to the first epitaxial layer, is then formed on the first epitaxial layer and on the sacrificial regions; the second epitaxial layer is in direct contact with the first epitaxial layer at the aforementioned openings and is a second structural layer wherein structural elements of the detection structure or a top part (i.e., farther away from the substrate) of the same structural elements are in part defined, by forming second trenches.

Then, the process envisages the partial or complete removal of the sacrificial regions, again by chemical etching (for example by hydrofluoric acid vapors), so as to release, at least in part, the structural elements of the detection structure.

Following the etching, regions of the second epitaxial layer may be: directly in (mechanical and electrical) contact with underlying regions of the first epitaxial layer and possibly in contact with the underlying substrate; separated by an empty region (gap) from the underlying first epitaxial layer so as to be suspended above the same first epitaxial layer; or coupled to (and electrically insulated from) the same first epitaxial layer by dielectric regions remaining from etching of the second sacrificial layer.

Figure 2A:
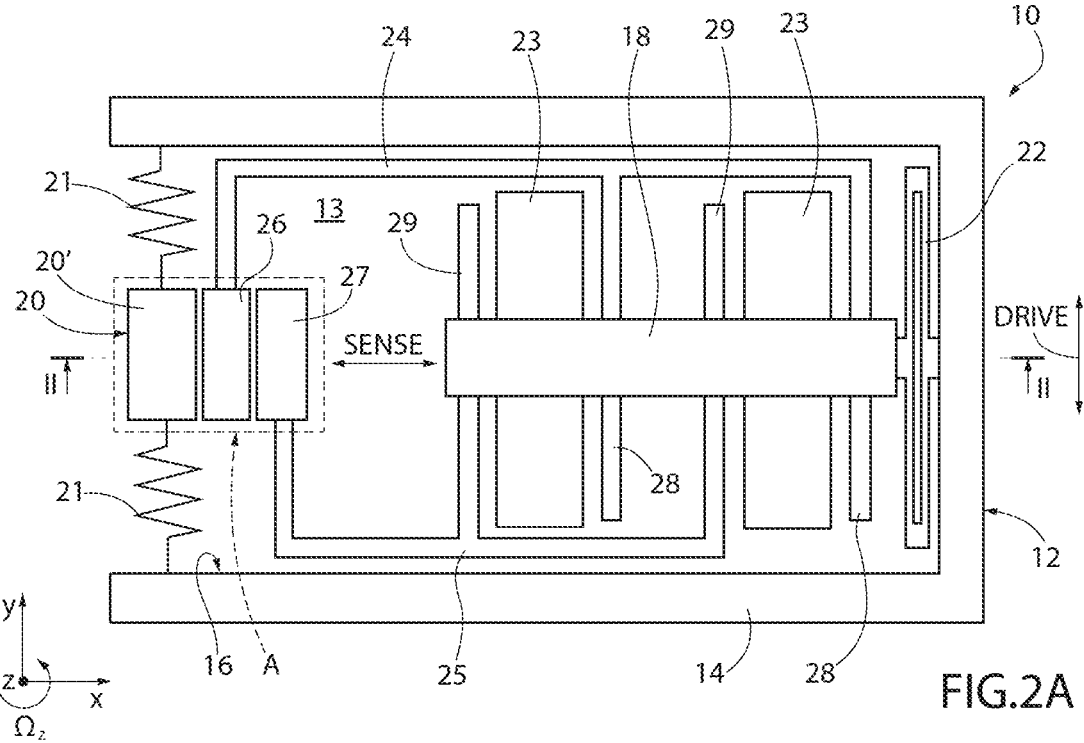
FIG. 2A is a schematic plan view of a detection structure of the MEMS gyroscope, in accordance with a first embodiment of the present solution.
Figure 2B:
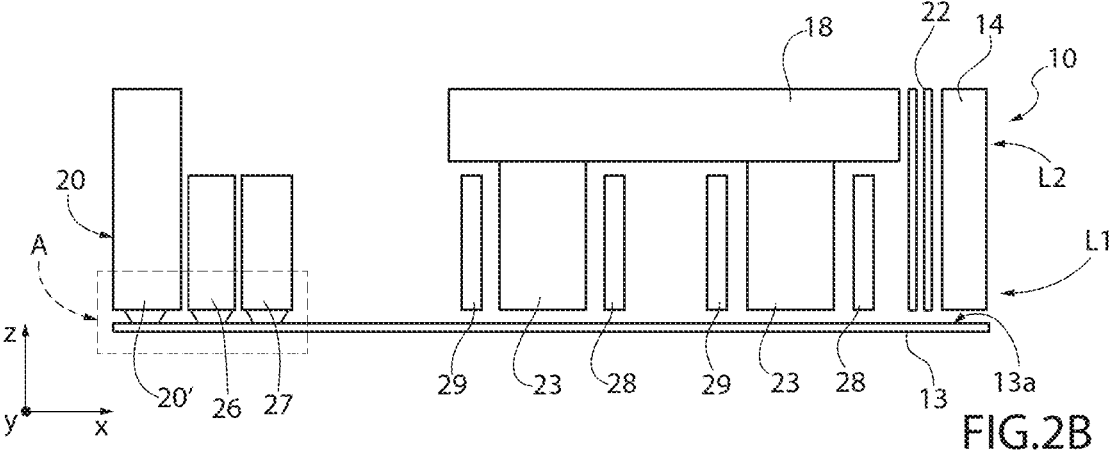
FIG. 2B is a schematic sectional view of the detection structure of FIG. 2A, taken along sectional line II-II.

With reference to the plan view of FIG. 2A and to the corresponding sectional view of FIG. 2B, a first embodiment of the present solution is now described, with reference to a detection structure 10 of a microelectromechanical (MEMS) gyroscope, for detecting an angular velocity $\Omega_z$ around a vertical axis z, orthogonal to a horizontal plane xy of main extension of the same detection structure 10.

In detail, the detection structure 10 comprises a movable (or rotor) structure 12, arranged suspended above a substrate 13, for example of semiconductor material, in particular silicon, having a top surface 13a; at rest, the movable structure 12 has a main extension in the horizontal plane xy and is arranged parallel to the top surface 13a of the substrate 13.

The movable structure 12 comprises a drive mass 14, having a substantially frame shape, in the example generically rectangular in the horizontal plane xy, internally defining a window 16; the same movable structure 12 also comprises a bridge element 18, rigid and of a conductive material, for example of epitaxial silicon (or of a suitable metal), which extends within the window 16, cantilevered suspended with respect to the substrate 13, in the example having a substantially rectangular shape in the horizontal plane xy, with a main extension along a first horizontal axis x.

In particular, the drive mass 14 is elastically coupled to a rotor anchoring structure 20, integral with the substrate 13 by a rotor anchor 20' at an anchoring area A, through elastic anchoring elements 21 (here illustrated schematically), configured to be yielding to a drive movement of the drive mass 14 along a second horizontal axis y of the horizontal plane xy (orthogonal to the first horizontal axis x) and instead to be rigid with respect to movements in other directions (in particular along the first horizontal axis x).

The aforementioned bridge element 18 is elastically coupled to the drive mass 14 through an elastic coupling element 22, having a folded configuration, configured so that the bridge element 18 is integral with the drive mass 14 during the drive movement along the second horizontal axis y and also so as to allow a sense movement of the same bridge element 18 along the first horizontal axis x, in the presence of the quantity to be detected (angular velocity or acceleration) around the vertical axis z. This sense movement of the bridge element 18 is decoupled and independent with respect to the drive movement of the aforementioned drive mass 14.

In detail, the bridge element 18 is arranged centrally to the window 16 with respect to the second horizontal axis y and is elastically coupled to the frame of the drive mass 14 at a first longitudinal end portion thereof along the first horizontal axis x.

The aforementioned rotor anchoring structure 20 is arranged centrally to the window 16, with respect to the direction of the second horizontal axis y, at a certain separation distance from a second longitudinal end portion of the same bridge element 18 along the first horizontal axis x (opposite to the aforementioned first end portion).

The frame of the drive mass 14 is formed by superimposing the aforementioned first and second structural layers, denoted by L1 and L2 in FIGS. 2A, 2B, therefore having a first thickness, while the bridge element 18 is formed in the sole second structural layer L2 (arranged at a greater distance with respect to the top surface 13a of the substrate 13), thus having a second thickness, smaller than the aforementioned first thickness.

The movable structure 12 of the detection structure 10 further comprises movable (rotor) electrodes 23, which are carried integrally by the bridge element 18 within the window 16 and have an extension along the second horizontal axis y, in the example with a substantially rectangular shape in the horizontal plane xy (and a symmetrical arrangement with respect to the first horizontal axis x).

In a possible implementation, these movable electrodes 23 are formed by superimposing the aforementioned first and second structural layers L1 and L2.

The detection structure 10 further comprises a first and a second stator elements 24, 25, arranged within the window 16, on opposite sides with respect to the first horizontal axis x and with respect to the bridge element 18, in a suspended configuration above the substrate 13.

The aforementioned first and second stator elements 24, 25 are integrally coupled to the substrate 13 at one end thereof, by a respective first and second stator anchors 26, 27 (coupled to the top surface 13a of the same substrate 13).

According to an aspect of the present solution, these first and second stator anchors 26, 27 are arranged at the aforementioned anchoring area A, in close proximity to the rotor anchor 20' (in particular, at a minimum distance made possible by the manufacturing process, for example by the photolithographic etching processes performed for defining the aforementioned first and second structural layers L1 and L2). By way of example, the aforementioned distance may vary from fractions of μm to a few μm, while the aforementioned anchoring area A may have an extension in the horizontal plane xy comprised between tens and hundreds of $\mu m^2$, based on the design need.

In greater detail, each of the first and second stator elements 24, 25 comprises a first portion, having a longitudinal extension along the first horizontal axis x; and a second portion, arranged in proximity of the anchoring area A, extending along the second horizontal axis y and which couples the aforementioned first portion to the respective first or second stator anchors 26, 27.

According to an aspect of the present solution, the aforementioned first portion of the first and second stator elements 24, 25 carries first, respectively second, stator electrodes 28, 29, having a longitudinal extension along the second horizontal axis y (in the example having a substantially rectangular shape in the horizontal plane xy), in an interdigitated configuration with the aforementioned movable electrodes 22, so as to define the aforementioned fully double-differential architecture.

In particular, the first stator electrodes 28 are arranged facing the respective movable electrodes 23 on a first side with respect to the first horizontal axis x; and the second stator electrodes 29 are arranged facing the same movable electrodes 23 on a second side with respect to the first horizontal axis x, at a same relative separation distance (so as to define a same capacitive coupling at rest). In the example, the movable electrodes 23 are interposed between a respective first stator electrode 28 and a respective second stator electrode 29.

In particular, the aforementioned first and second stator electrodes 28, 29 are formed in the sole first structural layer L1, so as to be arranged below the bridge element 18, at a certain separation distance (gap) from the same bridge element 18. In other words, the bridge element 18 extends longitudinally above the aforementioned first and second stator electrodes 28, 29 and the same movable electrodes 23, passing over them in the direction of its longitudinal extension (in the example along the first horizontal axis x).

During operation, the drive mass 14 of the movable structure 12 is actuated in the direction of the second horizontal axis y (by a driving electrode structure, not shown here for the sake of simplicity), so that the bridge element 18 performs, due to the Coriolis force and in the presence of the angular velocity to be detected around the vertical axis z, a sense movement in the direction of the first horizontal axis x.

This sense movement causes the capacitance variation of the detection capacitor formed by the capacitive coupling, in fully double-differential configuration, between the movable electrodes 23 carried by the same bridge element 18 and the first and second stator electrodes 28, 29.

It is highlighted that biasing of the movable electrodes 23 is performed through the aforementioned bridge element 18, of a conductive material, in turn in electrical connection with the rotor anchor 20' (and an associated electrical connection element, for example a connection pad or track, not shown here, formed on the substrate 13) through the elastic coupling element 22, the drive mass 14 and the elastic anchoring elements 21 (also being of a conductive material).

Similarly, the stator electrodes 28, 29 are electrically biased at different electrical potentials through the first, respectively the second, stator element 24, 25, and the first, respectively the second, stator anchor 26, 27.

Advantageously, anchoring the rotor and stator structures at the same anchoring area A ensures a substantial invariance of the distance at rest between the stator electrodes 28, 29 and the movable electrodes 23 as the operating conditions vary, resulting in an increase of the stability of the Zero Rate Level (ZRL) and of the Scale Factor (SF).

Figures 3, 4, 6:
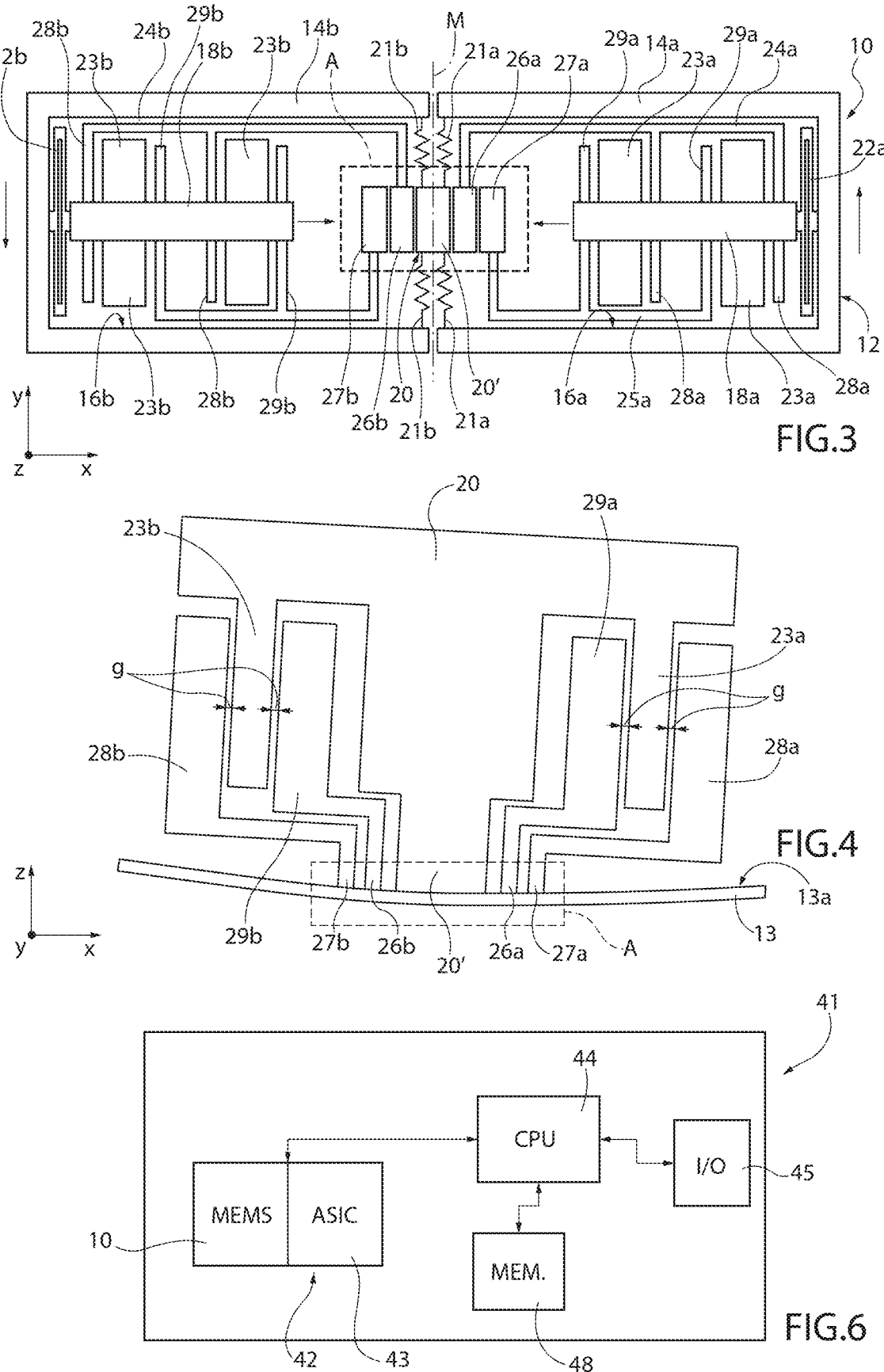
FIG. 3 is a schematic plan view of the detection structure, in a further embodiment.
FIG. 4 is a schematic sectional view of a common anchoring area of the detection structure of FIG. 3.
FIG. 6 is a schematic block diagram of an electronic apparatus wherein the MEMS gyroscope may be used.

As shown in FIG. 3, a further embodiment may provide for the detection structure 10 of the MEMS gyroscope to have a symmetrical configuration centrally with respect to the second horizontal axis y (in addition to the first horizontal axis x), with two halves specular with respect to a median axis M parallel to the same second horizontal axis y and centrally traversing the rotor anchor 20'.

In this case, each of the halves, denoted here by 10a and 10b (the references 'a' and 'b' being used to identify corresponding structural elements in the two halves 10a, 10b) is formed in a similar manner to what has been previously discussed, with the presence of the aforementioned rotor anchor 20, unique for the drive masses 14a, 14b of both halves 10a, 10b.

During operation, the aforementioned drive masses 14a, 14b of the two halves 10a, 10b are actuated (for example with alternating reciprocal movements) in opposite directions parallel to the second horizontal axis y; consequently, in the presence of the angular velocity to be detected, the bridge elements 18a, 18b of the two halves 10a, 10b move in a corresponding manner in the direction of the first horizontal axis x.

FIG. 4 shows a schematic sectional view relating to the common anchoring area A of the detection structure 10, with reference to the embodiment of the aforementioned FIG. 3.

In particular, the close mutual proximity between the rotor anchor 20' and the stator anchors 26a, 27a and 26b, 27b of both halves 10a, 10b is underlined, with a resulting absence of variations in the gap (denoted by g) at rest between the movable electrodes 23a, 23b and the facing stator electrodes 28a, 29a and 28b, 29b.

Figure 5:
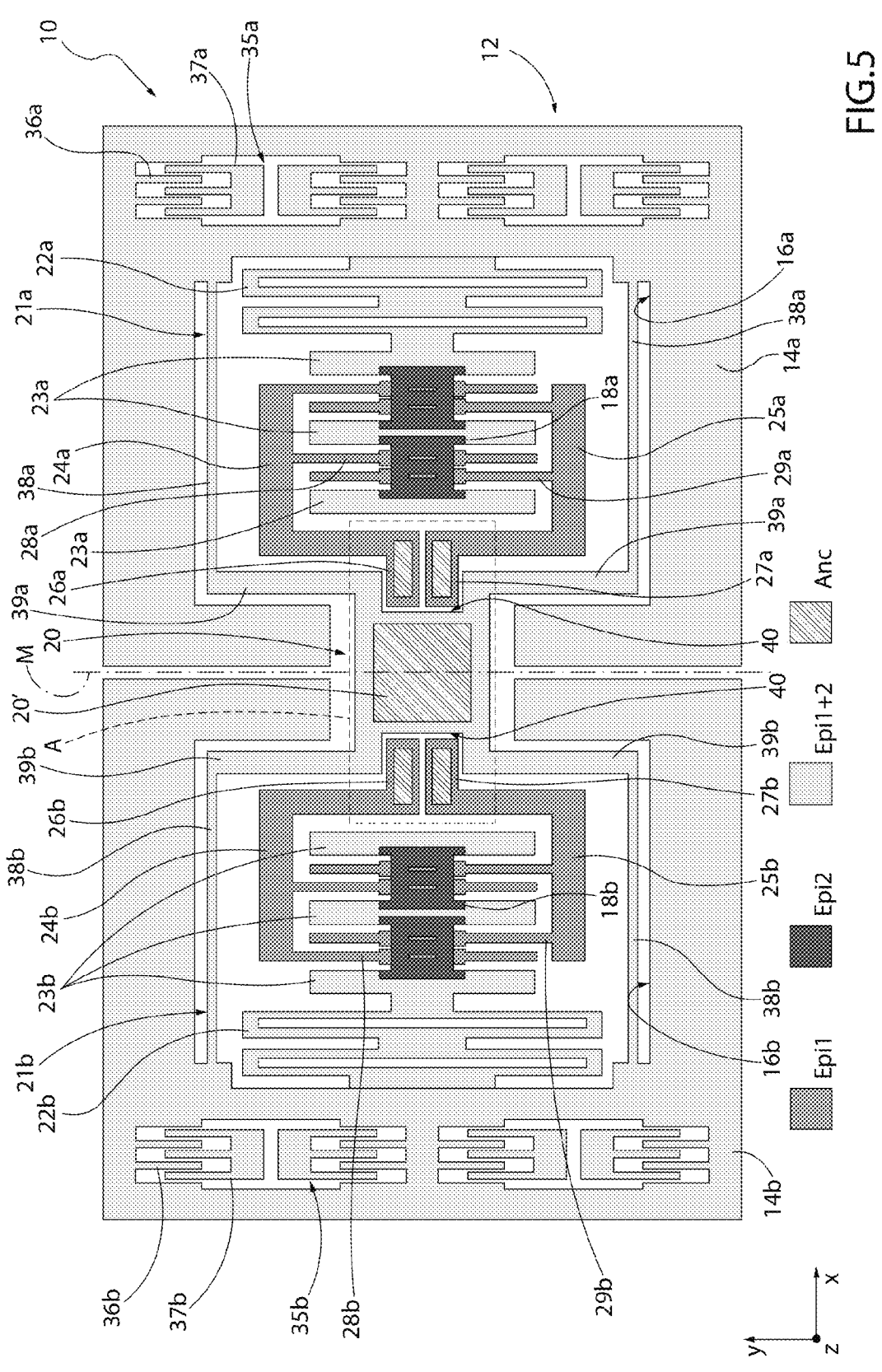
FIG. 5 is a more detailed plan view of a detection structure of the MEMS gyroscope, in accordance with a further embodiment of the present solution.

FIG. 5 shows, in greater detail, a possible implementation of the detection structure of FIG. 3.

In particular, it is underlined that, in this FIG. 5, the structural elements are represented with different colors, depending if they are formed: in the sole first structural layer L1 (here also denoted by Epi1); in the sole second structural layer L2 (here also denoted by Epi2); in both structural layers L1 and L2. The anchors (Anc) to the substrate 13 are also highlighted.

In particular, this FIG. 5 also shows the presence of drive electrode structures, indicated as a whole by 35a, 35b, arranged within the frame of the drive masses 14a, 14b, in particular in the corresponding side parallel to the second horizontal axis y, placed at a greater distance from the rotor anchor 20' and from the median axis M.

These drive electrode structures 35a, 35b comprise movable drive electrodes 36a, 36b, carried by the aforementioned frame of the drive masses 14a, 14b, and fixed drive electrodes 37a, 37b (integral with the substrate 13), interdigitated to the aforementioned movable drive electrodes 36a, 36b.

In the embodiment shown in the aforementioned FIG. 5, the elastic anchoring elements 21a, 21b of each half 10a, 10b each comprise: a first arm 38a, 38b, with longitudinal extension along the first horizontal axis x, and a second arm 39a, 39b, with longitudinal extension along the second horizontal axis y.

In particular, in each of the halves 10a, 10b, the first arms 38a, 38b extend between the frame of the associated drive mass 14a, 14b, at the aforementioned side parallel to the second horizontal axis y and placed at a greater distance from the rotor anchor 20', and the respective second arm 39a, 39b; the second arms 39a, 39b extend between the respective first arm 38a, 38b and the rotor anchor structure 20, on opposite sides of the same rotor anchor structure 20 along the second horizontal axis y.

Furthermore, in the embodiment illustrated in FIG. 5, the stator anchors 26a, 27a, 26b, 27b of both halves 10a, 10b are arranged (in the example aligned along the second horizontal axis y), at a recess 40 laterally formed in the structure of the rotor anchor 20, so as to be in greater proximity to each other and to the rotor anchor 20'.

Operation of the detection structure 10 of FIG. 5 does not depart from what has been illustrated and discussed above, in particular with reference to FIG. 3.

With reference to FIG. 6, an electronic apparatus 41 is now described, wherein the microelectromechanical gyroscope, denoted here by 42, may be used.

The microelectromechanical gyroscope 42 includes, in addition to the aforementioned detection structure 10, an ASIC circuit 43 which provides the associated reading interface (and which may be formed in the same die wherein the detection structure 10 is formed or in a different die, which may still be housed in the same package).

The electronic apparatus 41 is for example a portable mobile communication apparatus, such as for example a cellular telephone, a PDA (Personal Digital Assistant), a portable computer, but also a digital audio player capable of voice recording, a camera, a videogame controller, etc.; the electronic apparatus 41 is generally capable of processing, storing and/or transmitting and receiving signals and information.

The electronic apparatus 41 comprises a microprocessor (CPU) 44, which receives the signals detected by the detection structure 10, and an input/output interface 45, for example provided with a keyboard and a display, coupled to the microprocessor 44. Furthermore, the electronic apparatus 41 may comprise an internal memory 48, operatively coupled to the microprocessor 44.

The advantages of the microelectromechanical gyroscope according to the present solution are clear from the above description.

In any case, it is again underlined that the present solution essentially allows cancelling of the drifts of electrical performances of the detection structure 10 of the MEMS gyroscope 42, due to the deformations of the substrate 13, in the presence of external stresses and stimuli, for example due to temperature variations or mechanical stresses, for example resulting from soldering to a printed circuit or from causes of different nature (such as aging or humidity absorption).

The detection structure 10 is thus extremely stable, regardless of the operating conditions and of the assembly in the corresponding package. In particular, the stability of the aforementioned Zero Rate Levels (ZRL) and Scale Factor (SF) is high.

Furthermore, the general detection performances, for example in terms of sensitivity, do not vary with respect to traditional solutions, given that the detection mechanism is not modified, as well as the shape and arrangement of the sensing electrodes with respect to the inertial mass are not substantially modified.

Finally, it is clear that modifications and variations may be made to what has been described and illustrated herein without thereby departing from the scope of the present disclosure, as defined in the attached claims.

In particular, it is evident that the detection structure 10 of the microelectromechanical gyroscope 42 may be rotated (by 90°) in the horizontal plane xy, with the drive movement which in this case may occur along the first horizontal axis x and the sense movement which may occur along the second horizontal axis y (the bridge element 18 being in this case directed along the same second horizontal axis y).

Furthermore, aspects of the detection structure 10 might vary, without this entailing substantial modifications to the proposed solution. For example, a different shape might be provided in the horizontal plane xy of the frame of the drive mass 14 or of the same bridge element 18.

A microelectromechanical gyroscope (42), provided with a detection structure (10) having a substrate (13) with a top surface (13*a*) parallel to a horizontal plane (xy) and a movable structure (12), suspended above the substrate (13) and configured to perform, as a function of an angular velocity ($\Omega_z$) around a vertical axis (z), orthogonal to said horizontal plane (xy), a sense movement along a first horizontal axis (x) of said horizontal plane, in the presence of a drive movement along a second horizontal axis (y) of said horizontal plane, orthogonal to said first horizontal axis (x); wherein said movable structure (12) may be summarized as including at least one drive mass (14) internally defining a window (16) and elastically coupled to a rotor anchor (20'), integral with the substrate (13) at an anchoring area (A), through elastic anchoring elements (21); at least one bridge element (18), rigid and of a conductive material, cantilevered suspended with respect to the substrate (13) and extending within the window (16), elastically coupled to the drive mass (14); and movable electrodes (23), integrally carried by the bridge element (18) within the window (16); wherein said detection structure (10) further includes stator electrodes (28, 29), arranged in said window (16) in an interdigitated configuration with said movable electrodes (23), said stator electrodes (28, 29) being arranged below the bridge element (18), at a certain separation distance from said bridge element (18), which extends longitudinally above said stator electrodes (28*a*, 28*b*).

Said detection structure (10) may include a first and a second stator elements (24, 25), arranged within the window (16), on opposite sides with respect to the bridge element (18), in suspended configuration above the substrate (13) and integrally coupled to the substrate (13) through a respective first and second stator anchors (26, 27); said first and second stator elements (24, 25) carrying first, respectively second, electrodes of said stator electrodes (28, 29).

Each of said first and second stator elements (24, 25) may include a first portion that carries said first, respectively, second stator electrodes (28, 29); and a second portion, arranged at the anchoring area (A), which couples said first portion to the respective first, respectively second, stator anchors (26, 27).

Said first and second stator anchors (26, 27) may be arranged at said anchoring area (A), in proximity of the rotor anchor (20').

Said stator anchors (26, 27) may be arranged at a recess (40) formed laterally in a rotor anchoring structure (20), so as to be in proximity to each other and to said rotor anchor (20').

Said first stator electrodes (28) may be arranged facing the respective movable electrodes (23) on a first side with respect to the first horizontal axis (x); and the second stator electrodes (29) may be arranged facing the movable electrodes (23) on a second side with respect to the first horizontal axis (x), at a same relative separation distance at rest, in the absence of said angular velocity ($\Omega_z$).

Said anchoring area (A) may be arranged centrally with respect to said window (16) in the direction of said second horizontal axis (y).

Said bridge element (18) may be arranged centrally to the window (16) with respect to the second horizontal axis (y) and may be elastically coupled to the drive mass (14) at a first longitudinal end portion thereof along the first horizontal axis (x); and said rotor anchor (20') may be arranged at a certain separation distance from a second longitudinal end portion of said bridge element (18) along the first horizontal axis (x), opposite to said first end portion.

The gyroscope may include a first and a second structural layers (L1, L2), superimposed on each other and arranged above said substrate (13); wherein said bridge element (18) may be formed in said second structural layer (L2), arranged at a greater distance with respect to said front surface (13*a*) of the substrate (13); and said stator electrodes (28, 29) may be formed in said first structural layer (L1), arranged at a smaller distance with respect to said front surface (13*a*) of the substrate (13).

Said drive mass (14) and said movable electrodes (23) may be formed in both said first and second structural layers (L1, L2).

Said first and second structural layers (L1, L2) may be epitaxial silicon layers arranged above the top surface (13*a*) of said substrate (13).

Said bridge element (18) may be elastically coupled to the drive mass (14) through an elastic coupling element (22), configured so as to make the bridge element (18) integral with the drive mass (14) during a corresponding drive movement along the second horizontal axis (y) and also so as to allow a sense movement of the same bridge element (18) along the first horizontal axis (x), in the presence of said angular velocity ($\Omega_z$) around the vertical axis (z).

The sense movement of the bridge element (18) may be decoupled and independent with respect to the drive movement of said drive mass (14).

Said stator electrodes (28, 29) may be coupled to said movable electrodes (23) in a fully double-differential configuration.

Said detection structure (10) may have a centrally symmetrical configuration with respect to said first (x) and second (y) horizontal axes, with two halves (10a, 10b) specular with respect to a median axis (M) parallel to said second horizontal axis (y) and centrally traversing said rotor anchor (20'), each of the two halves having a respective drive mass (14a, 14b) and a respective bridge element (18a, 18b); wherein the respective drive masses (14a, 14b) of the two halves (10a, 10b) may be configured so as to be actuated in opposite directions in a direction parallel to the second horizontal axis (y) to cause a corresponding sense movement of the respective bridge elements (18a, 18b).

An electronic device (41), may be summarized as including the microelectromechanical gyroscope (42), and a processing unit (44) coupled to the microelectromechanical gyroscope (42) and configured to receive detection signals indicative of said angular velocity ($\Omega_z$).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
   a detection structure having a substrate with a top surface parallel to a horizontal plane; and
   a movable structure, suspended above the substrate and configured to perform, as a function of an angular velocity around a vertical axis, orthogonal to the horizontal plane, a sense movement along a first horizontal axis of the horizontal plane, in the presence of a drive movement along a second horizontal axis of the horizontal plane, orthogonal to the first horizontal axis the movable structure includes:
   at least one drive mass internally defining a window and elastically coupled to a rotor anchor, integral with the substrate at an anchoring area, through elastic anchoring elements;
   at least one bridge element, rigid and of a conductive material, cantilevered suspended with respect to the substrate and extending within the window, elastically coupled to the drive mass; and
   movable electrodes, integrally carried by the bridge element within the window;
   wherein the detection structure further comprises stator electrodes, arranged in the window in an interdigitated configuration with the movable electrodes, the stator electrodes being arranged below the bridge element, at a certain separation distance from the bridge element, which extends longitudinally above the stator electrodes;
   wherein the detection structure further comprises a first and a second stator elements, arranged within the window, on opposite sides with respect to the bridge element, in suspended configuration above the substrate and integrally coupled to the substrate through a respective first and second stator anchors arranged at the anchoring area, in proximity of the rotor anchor; the first and second stator elements carrying first, respectively second, electrodes of the stator electrodes.

2. The gyroscope according to claim 1, wherein each of the first and second stator elements comprises a first portion that carries the first, respectively, second stator electrodes; and a second portion, arranged at the anchoring area, which couples the first portion to the respective first, respectively second, stator anchors.

3. The gyroscope according to claim 1, wherein the stator anchors are arranged at a recess formed laterally in a rotor anchoring structure, so as to be in proximity to each other and to the rotor anchor.

4. The gyroscope according to claim 1, wherein the first stator electrode is arranged facing the respective movable electrodes on a first side with respect to the first horizontal axis; and the second stator electrode is arranged facing the movable electrodes on a second side with respect to the first horizontal axis, at a same relative separation distance at rest, in the absence of the angular velocity.

5. The gyroscope according to claim 1, wherein the anchoring area is arranged centrally with respect to the window in the direction of the second horizontal axis.

6. The gyroscope according to claim 5, wherein the bridge element is arranged centrally to the window with respect to the second horizontal axis and is elastically coupled to the drive mass at a first longitudinal end portion thereof along the first horizontal axis; and wherein the rotor anchor is arranged at a certain separation distance from a second longitudinal end portion of the bridge element along the first horizontal axis, opposite to the first end portion.

7. The gyroscope according to claim 1, comprising a first and a second structural layers, superimposed on each other and arranged above the substrate; wherein the bridge element is formed in the second structural layer, arranged at a greater distance with respect to the front surface of the substrate; and the stator electrodes are formed in the first structural layer, arranged at a smaller distance with respect to the front surface of the substrate.

8. The gyroscope according to claim 7, wherein the drive mass and the movable electrodes are formed in both the first and second structural layers.

9. The gyroscope according to claim 7, wherein the first and second structural layers are epitaxial silicon layers arranged above the top surface of the substrate.

10. A device, comprising:
   a microelectromechanical gyroscope that includes:
   a substrate;
   a movable structure, suspended above the substrate, the movable structure includes:
   a rotor anchor, integral with the substrate at an anchoring area;
   at least one drive mass having a window and coupled to the rotor anchor;
   at least one bridge element, cantilevered suspended with respect to the substrate and extending within the window; and
   movable electrodes carried by the bridge element within the window; and
   a detection structure on the substrate with a top surface, the detection structure includes:
   stator electrodes, in the window in an interdigitated configuration with the movable electrodes, the stator electrodes being below the bridge element, at a certain separation distance from the bridge element, which extends longitudinally above the stator electrodes;

wherein the detection structure comprises a first and a second stator elements, arranged within the window, on opposite sides with respect to the bridge element, in suspended configuration above the substrate and integrally coupled to the substrate through a respective first and second stator anchors arranged at the anchoring area, in proximity of the rotor anchor; the first and second stator elements carrying first, respectively second, electrodes of the stator electrodes.

11. The device of claim 10, wherein the bridge element is elastically coupled to the drive mass through an elastic coupling element.

12. The gyroscope according to claim 11, wherein the bridge element is configured so as to make the bridge element integral with the drive mass during a corresponding drive movement along a second horizontal axis and also so as to allow a sense movement of the same bridge element along a first horizontal axis, in the presence of an angular velocity around a vertical axis, the sense movement of the bridge element is decoupled and independent with respect to the drive movement of the drive mass.

13. The gyroscope according to claim 10, wherein the stator electrodes are coupled to the movable electrodes in a fully double-differential configuration.

14. The gyroscope according to claim 10, wherein the detection structure has a centrally symmetrical configuration with respect to a first and second horizontal axes, with two halves specular with respect to a median axis parallel to the second horizontal axis and centrally traversing the rotor anchor, each of the two halves having a respective drive mass and a respective bridge element; wherein the respective drive masses of the two halves are configured so as to be actuated in opposite directions in a direction parallel to the second horizontal axis to cause a corresponding sense movement of the respective bridge elements.

15. An electronic device, comprising:

a microelectromechanical gyroscope that includes:

a detection structure having a substrate with a top surface parallel to a horizontal plane; and a movable structure, suspended above the substrate and configured to perform, as a function of an angular velocity around a vertical axis, orthogonal to the horizontal plane, a sense movement along a first horizontal axis of the horizontal plane, in the presence of a drive movement along a second horizontal axis of the horizontal plane, orthogonal to the first horizontal axis the movable structure includes:

at least one drive mass internally defining a window and elastically coupled to a rotor anchor, integral with the substrate at an anchoring area, through elastic anchoring elements;

at least one bridge element, rigid and of a conductive material, cantilevered suspended with respect to the substrate and extending within the window, elastically coupled to the drive mass; and movable electrodes, integrally carried by the bridge element within the window; and wherein the detection structure further comprises stator electrodes, arranged in the window in an interdigitated configuration with the movable electrodes, the stator electrodes being arranged below the bridge element, at a certain separation distance from the bridge element, which extends longitudinally above the stator electrodes;

wherein the detection structure further comprises a first and a second stator elements, arranged within the window, on opposite sides with respect to the bridge element, in suspended configuration above the substrate and integrally coupled to the substrate through a respective first and second stator anchors arranged at the anchoring area, in proximity of the rotor anchor; the first and second stator elements carrying first, respectively second, electrodes of the stator electrodes.

16. The electronic device of claim 15, wherein each of the first and second stator elements comprises a first portion that carries the first, respectively, second stator electrodes; and a second portion, arranged at the anchoring area, which couples the first portion to the respective first, respectively second, stator anchors.

* * * * *